United States Patent
Chen

(10) Patent No.: US 11,258,793 B2
(45) Date of Patent: Feb. 22, 2022

(54) MANAGING SYSTEM AND MANAGING METHOD FOR MANAGING AUTHENTICATION FOR CLOUD SERVICE SYSTEM

(71) Applicant: TRUSTVIEW INC., Taipei (TW)

(72) Inventor: Ting-Huang Chen, Taipei (TW)

(73) Assignee: TRUSTVIEW INC., Taipei (TW)

( * ) Notice: Subject to any disclaimer, the term of this patent is extended or adjusted under 35 U.S.C. 154(b) by 321 days.

(21) Appl. No.: 16/510,377

(22) Filed: Jul. 12, 2019

(65) Prior Publication Data

US 2020/0021587 A1    Jan. 16, 2020

(30) Foreign Application Priority Data

Jul. 13, 2018   (TW) ................... 107124198

(51) Int. Cl.
  *G06F 21/00* (2013.01)
  *H04L 29/06* (2006.01)
  *H04L 67/10* (2022.01)

(52) U.S. Cl.
  CPC ........ *H04L 63/0884* (2013.01); *H04L 63/083* (2013.01); *H04L 63/0861* (2013.01); *H04L 67/10* (2013.01); *H04L 2463/082* (2013.01)

(58) Field of Classification Search
  CPC ... H04L 63/0884; H04L 63/083; H04L 67/10; H04L 63/0861; H04L 2463/082
  See application file for complete search history.

(56) References Cited

U.S. PATENT DOCUMENTS

| | | | |
|---|---|---|---|
| 9,594,911 B1* | 3/2017 | Khitrenovich | G06F 21/31 |
| 2008/0244719 A1* | 10/2008 | Hariya | G06F 21/41 |
| | | | 726/8 |
| 2009/0006861 A1* | 1/2009 | Bemmel | G06F 21/445 |
| | | | 713/189 |
| 2018/0018475 A1* | 1/2018 | Li | G06F 21/6281 |
| 2019/0123904 A1* | 4/2019 | Ackerman | G06F 21/57 |
| 2019/0286832 A1* | 9/2019 | Szeto | G06F 21/6218 |

FOREIGN PATENT DOCUMENTS

TW        I592824 B    7/2017

* cited by examiner

*Primary Examiner* — Kendall Dolly
(74) *Attorney, Agent, or Firm* — Muncy, Geissler, Olds & Lowe, P.C.

(57) ABSTRACT

The invention discloses a managing system and managing method for managing authentication for a cloud service system. When a user operates a data processing apparatus to execute an unprotected start-up procedure to start up a browser application to access from an unprotected space of a data storage unit and transmits an authentication data including no characteristic data associated with a protected space of the data storage unit to the cloud service system through the browser application, the cloud service system redirects the authentication data to an authentication server. The authentication server judges if the authentication data has the characteristic data associated with the protected space, and if NO, the authentication server transmits an alert message representative of refusal of login to the cloud service system. The cloud service system redirects the alert message to the browser application.

6 Claims, 4 Drawing Sheets

MANAGING SYSTEM AND MANAGING METHOD FOR MANAGING AUTHENTICATION FOR CLOUD SERVICE SYSTEM

CROSS-REFERENCE TO RELATED APPLICATION

This utility application claims priority to Taiwan Application Serial Number 107124198, filed Jul. 13, 2018, which is incorporated herein by reference.

BACKGROUND OF THE INVENTION

1. Field of the Invention

The invention relates to a managing system and a managing method for managing authentication for a cloud service system, and more in particular, to a managing system and managing method capable of establishing authentication with a cloud service system by confirming that a user operates in a safety protected space of a data processing apparatus.

2. Description of the Prior Art

In today's enterprises, government agencies and other organizations, most of the control over the use of data processing apparatuses use security personnel and management software to achieve strict control. However, with the rise of cloud services, enterprises, government agencies and other organizations have also used cloud service resources, such as cloud storage, cloud computing, community communications, etc. Personal use of cloud service resources is also increasing.

Most of the mechanisms for the current data processing apparatuses to the cloud service system login authentication are only weak authentication with inputting of account and password. As enterprises, government agencies and other organizations rely on cloud service resources, it is obvious that there is a need to more securely control system and method for managing authentication for cloud service systems.

A prior art of Taiwan Patent issued No. I592824 discloses a data processing system capable of securing files. The data processing system divides a storage device into a protected space and an unprotected space, and therefore, malicious attacks such as ransomwares cannot attack the important files stored in the protected space. For protected space created at user terminal, ransomwares cannot read, write and destroy the important files stored in the protected space. However, ransomware is most often downloaded to a data processing apparatus when the data processing apparatus is linked to the cloud service system. At present, there is a lack of technology that can prevent the ransomware from being downloaded to the data processing apparatus of the prior art.

SUMMARY OF THE INVENTION

Accordingly, one scope of the invention is to provide a managing system and a managing method for managing authentication for a cloud service system. In particular, the managing system and the managing method according to the invention can establish authentication with the cloud service system by confirming that a user operates in a safety protected space of a data processing apparatus.

A managing system according to a first preferred embodiment of the invention is for managing authentication for a cloud service system, and includes a data processing apparatus, a safety gateway device and an authentication server. The data processing apparatus is capable of being linked to the cloud service system through a first network. The data processing apparatus includes a data storage unit and at least one processor. The data storage unit is divided into an unprotected space and a protected space. A browser application is stored in the data storage unit, but does not need to be stored in the protected space of the data storage unit. A characteristic data associated with the protected space is stored in the protected space. The at least one processor is coupled to the data storage unit. The safety gateway device is coupled to the data processing apparatus. The authentication server is capable of being linked to the cloud service system through a second network, and therein stores a plurality of first authentication data. When a user operates the at least one processor to execute an unprotected start-up procedure to start up the browser application to access from the unprotected space and further to link to the cloud service system, the at least one processor makes the browser application to link to the cloud service system through the first network. The user operates the browser application to transmit a login request information to the cloud service system. The cloud service system forwards the login request information to the authentication server through the second network. The authentication server transmits an authentication data request information to the cloud service system in response to the login request information. The cloud service system forwards the authentication data request information to the browser application. The user operates the browser application to input a second authentication data in response to the authentication data request information, and transmits the second authentication data to the cloud service system. The cloud service system forwards the second authentication data to the authentication server. The authentication server judges if the second authentication data has the characteristic data associated with the protected space, and if NO, the authentication server transmits an alert message representative of refusal of login to the cloud service system. The cloud service system forwards the alert message to the browser application.

In one embodiment, the alert message includes a request information of login through the protected space.

In one embodiment, each first authentication data includes an account number, a password, a sample facial image, a sample biometric data or other kind of authentication data.

Further, when the user operates the at least one processor to execute a protected start-up procedure to start up the browser application to access from the protected space and further to link to the cloud service system, the at least one processor makes the browser application to link to the cloud service system through the safety gateway device and the first network. The user operates the browser application to transmit the login request information to the cloud service system. The cloud service system forwards the login request information to the authentication server through the second network. The authentication server transmits the authentication data request information to the cloud service system in response to the login request information. The cloud service system forwards the authentication data request information to the browser application. The user operates the browser application to input a third authentication data in response to the authentication data request information. The browser application accesses the characteristic data associated with the protected space from the protected space, combines the third authentication data with the characteristic data associated with the protected space into a fourth authentication data, and transmits the fourth authentication data to the cloud service system. The cloud service system forwards the fourth authentication data to the authentication server. The authentication server judges if the fourth authentication data has the characteristic data associated with the protected space, and if YES, the authentication server judges if the third authentication data matches one of the plurality of first authentication data, and if YES, the authentication server transmits a login confirmation message to the cloud service system. The cloud service system forwards the login confirmation message to the browser application.

A managing method, according to a second preferred embodiment of the invention, is for managing authentication for a cloud service system. A data processing apparatus is capable of being linked to the cloud service system through a first network and includes a data storage unit and at least one processor. The data storage unit is divided into an unprotected space and a protected space. A browser application is stored in the data storage unit, but does not need to be stored in the protected space of the data storage unit. A characteristic data associated with the protected space is stored in the protected space. An authentication server is capable of being linked to the cloud service system through a second network, and therein stores a plurality of first authentication data. The managing method according to the invention is, firstly, to link the browser application, by use of the at least one processor, to the cloud service system through the first network when a user operates the at least one processor to execute an unprotected start-up procedure to start up the browser application to access from the unprotected space and further to link to the cloud service system. Next, the managing method according to the invention is to operate the browser application, by the user, to transmit a login request information to the cloud service system. Then, the managing method according to the invention is to forward the login request information, by the cloud service system, to the authentication server through the second network. Subsequently, the managing method according to the invention is to transmit an authentication data request information, by the authentication server, to the cloud service system in response to the login request information. Afterward, the managing method according to the invention is to forward the authentication data request information, by the cloud service system, to the browser application. Next, the managing method according to the invention is to operate the browser application, by the user, to input a second authentication data and to transmit the second authentication data to the cloud service system in response to the authentication data request information. Then, the managing method according to the invention is to forward the second authentication data, by the cloud service system, to the authentication server. Subsequently, the managing method according to the invention is to judge, by the authentication server, if the second authentication data has the characteristic data associated with the protected space. Then, if the judged result is NO, the managing method according to the invention is to transmit an alert message representative of refusal of login, by the authentication server, to the cloud service system. Finally, the managing method according to the invention is to forward the alert message, by the cloud service system, to the browser application.

Further, the managing method according to the invention is also to link the browser application, by use of the at least one processor, to the cloud service system through a safety gateway device and the first network when the user operates the at least one processor to execute a protected start-up procedure to start up the browser application to access from the protected space and further to link to the cloud service system. Next, the managing method according to the invention is to operate the browser application, by the user, to transmit the login request information to the cloud service system. Then, the managing method according to the invention is to forward the login request information, by the cloud service system, to the authentication server through the second network. Subsequently, the managing method according to the invention is to transmit the authentication data request information, by the authentication server, to the cloud service system in response to the login request information. Afterward, the managing method according to the invention is to forward the authentication data request information, by the cloud service system, to the browser application. Next, the managing method according to the invention is to operate the browser application, by the user, to input a third authentication data in response to the authentication data request information. Then, the managing method according to the invention is to access, by the browser application, the characteristic data associated with the protected space from the protected space, to combine the third authentication data with the characteristic data associated with the protected space into a fourth authentication data, and to transmit the fourth authentication data to the cloud service system. Subsequently, the managing method according to the invention is to forward the fourth authentication data, by the cloud service system, to the authentication server. Afterward, the managing method according to the invention is to judge, by the authentication server, if the fourth authentication data has the characteristic data associated with the protected space. Then, if the judged result is YES, the managing method according to the invention is to judge, by the authentication server, if the third authentication data matches one of the plurality of first authentication data. Then, if the judged result is YES, the managing method according to the invention is to transmit a login confirmation message, by the authentication server, to the cloud service system. Finally, the managing method according to the invention is to forward the login confirmation message, by the cloud service system, to the browser application.

Compared to the prior art, the managing system and the managing method according to the invention can establish authentication with the cloud service system by confirming that a user operates in a safety protected space of a data processing apparatus.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
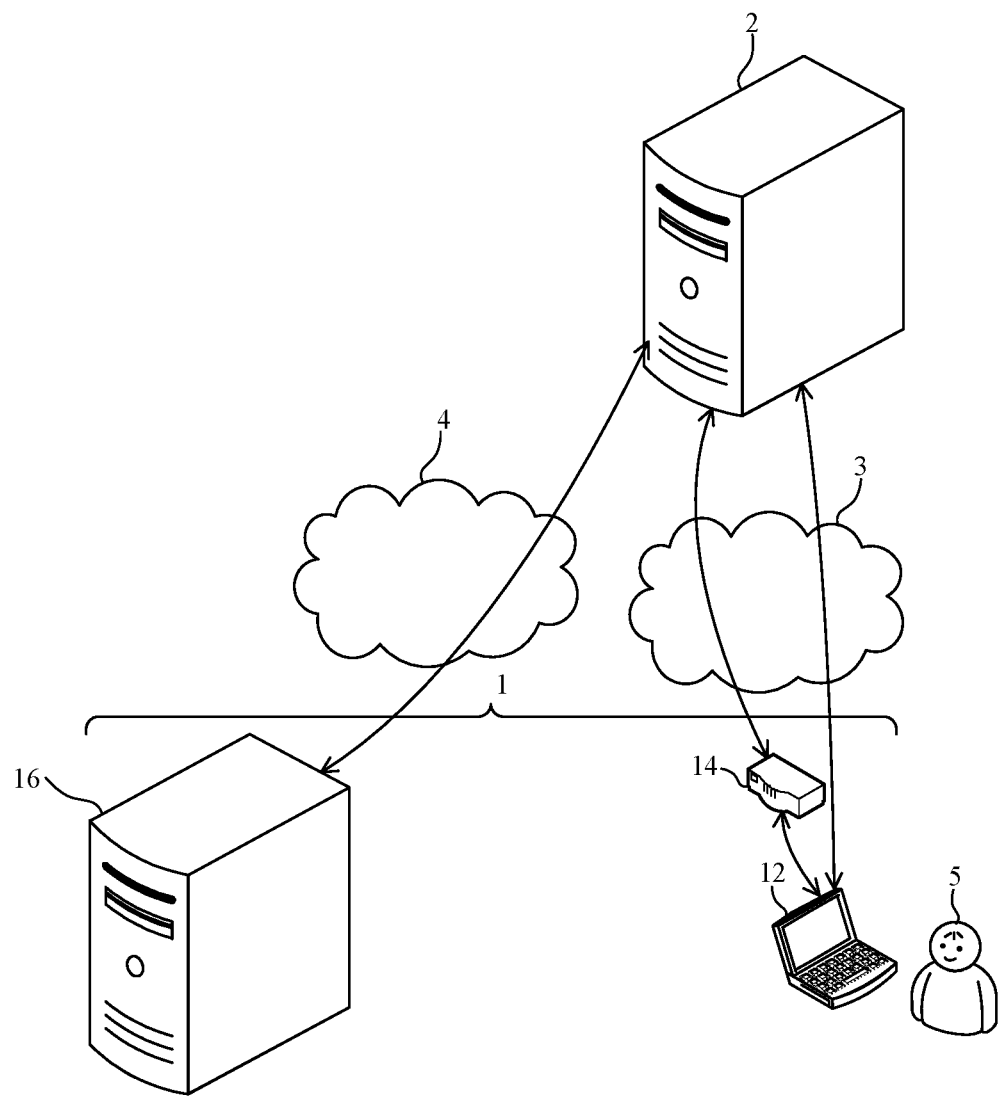
FIG. 1 is a schematic diagram of a managing system for managing authentication for a cloud service system and an implementation architecture thereof in accordance with the first preferred embodiment of the invention.
Figure 2:
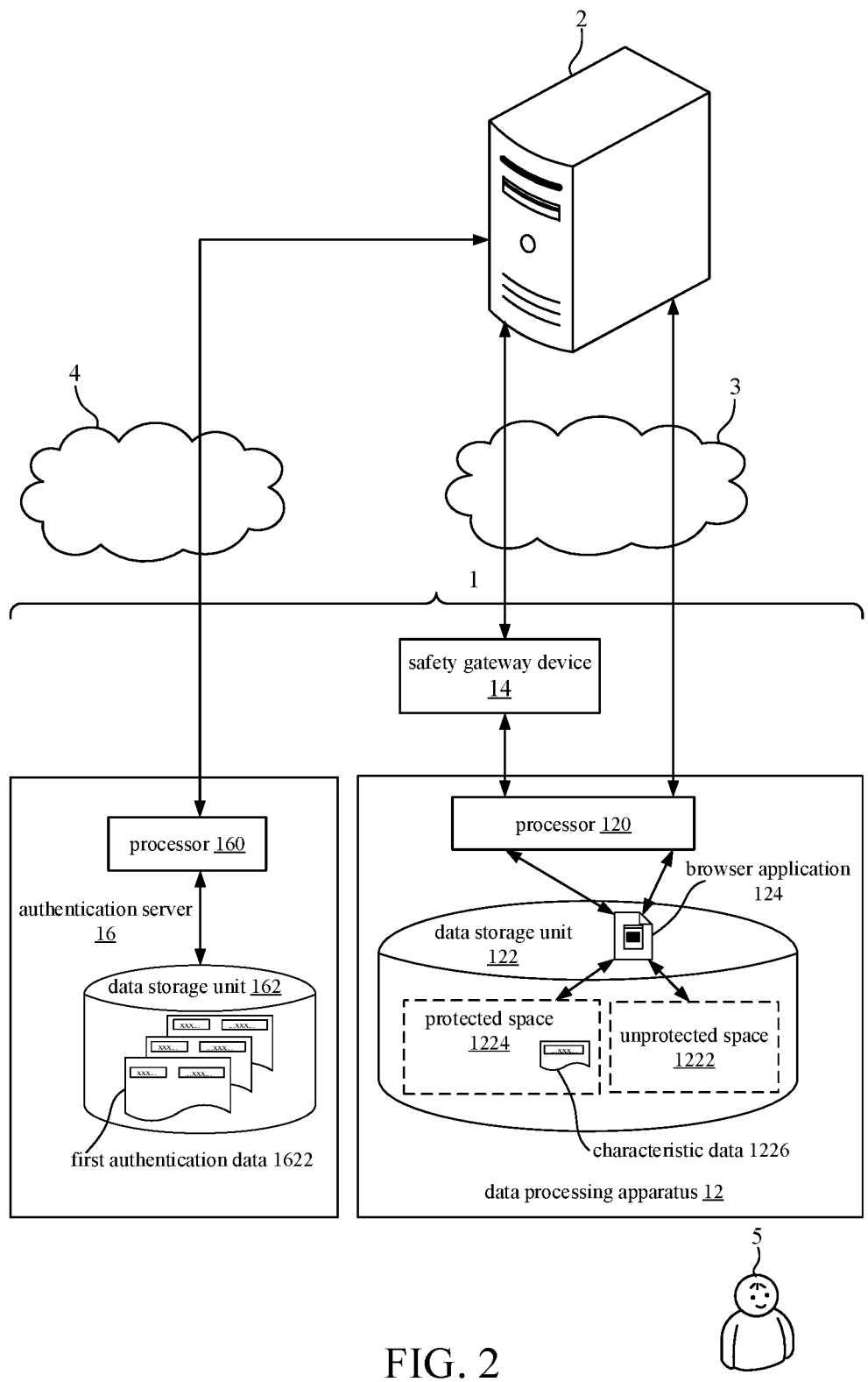
FIG. 2 is a functional block diagram of the managing system for managing authentication for the cloud service system in accordance with the first preferred embodiment of the invention.

Referring to FIG. 1 and FIG. 2, a managing system 1, according to the first preferred embodiment of the invention, for managing authentication for a cloud service system 2 and an implementation architecture thereof is illustratively shown in FIG. 1. FIG. 2 is a functional block diagram of the managing system 1 for managing authentication for the cloud service system 2 in accordance with the first preferred embodiment of the invention.

As shown in FIG. 1 and FIG. 2, the managing system 1, according to the first preferred embodiment of the invention, for a cloud service system 2 includes a data processing apparatus 12, a safety gateway device 14 and an authentication server 16.

The data processing apparatus 12 is capable of being linked to the cloud service system 2 through a first network 3. The data processing apparatus 12 includes a data storage unit 122 and at least one processor 120. The data storage unit 122 is divided into an unprotected space 1222 and a protected space 1224. A browser application 124 is stored in the data storage unit 122, but does not need to be stored in the protected space 1224 of the data storage unit 122. A characteristic data 1226 associated with the protected space 1224 of the data storage unit 122 is stored in the protected space 1224.

In one embodiment, the first network 3 can be an intranet, an internet, an extranet, a local area network, a wide area network, an Ethernet, a cable TV network, a radio telecommunication network, a public switched telephone network, a 3G network, a 4G network, a 5G networks, a 6G network, an HSPA networks, a Wi-Fi networks, a WiMAX networks, an LTE networks, or other popular commercial public networks.

The at least one processor 120 is coupled to the data storage unit 122. The safety gateway device 14 is coupled to the data processing apparatus 12. The authentication server 16 is capable of being linked to the cloud service system 2 through a second network 4, and therein stores a plurality of first authentication data 1622. The authentication server 16 includes at least one processor 160 and a data storage unit 162. The data storage unit 162 is for storing the plurality of first authentication data 1622.

In one embodiment, the second network 4 can be an intranet, an interne, an extranet, a local area network, a wide area network, an Ethernet, a cable TV network, a radio telecommunication network, a public switched telephone network, a 3G network, a 4G network, a 5G networks, a 6G network, an HSPA networks, a Wi-Fi networks, a WiMAX networks, an LTE networks, or other popular commercial public networks. In practical applications, the first network 3 and the second network 4 can be the same network.

As shown in FIG. 2, when a user 5 operates the at least one processor 120 to execute an unprotected start-up procedure to start up the browser application 124 to access from the unprotected space 1222 of the data storage unit 122 and further to link to the cloud service system 2, the at least one processor 120 makes the browser application 124 to link to the cloud service system 2 through the first network 3. The user 5 operates the browser application 124 to transmit a login request information to the cloud service system 2. The cloud service system 2 forwards the login request information to the authentication server 16 through the second network 4. The authentication server 16 transmits an authentication data request information to the cloud service system 2 in response to the login request information. The cloud service system 2 forwards the authentication data request information to the browser application 124. The user 5 operates the browser application 124 to input a second authentication data in response to the authentication data request information, and transmits the second authentication data to the cloud service system 2. The cloud service system 2 forwards the second authentication data to the authentication server 16. The authentication server 16 judges if the second authentication data has the characteristic data 1226 associated with the protected space 1224, and if NO, the authentication server 16 transmits an alert message representative of refusal of login to the cloud service system 2. The cloud service system 2 forwards the alert message to the browser application 124.

In one embodiment, the alert message includes a request information of login through the protected space 1224.

Further, also as shown in FIG. 2, when the user 5 operates the at least one processor 120 to execute a protected start-up procedure to start up the browser application 124 to access from the protected space 1224 of the data storage unit 122 and further to link to the cloud service system 2, the at least one processor 120 makes the browser application 124 to link to the cloud service system 2 through the safety gateway device 14 and the first network 3. The user 5 operates the browser application 124 to transmit the login request information to the cloud service system 2. The cloud service system 2 forwards the login request information to the authentication server 16 through the second network 4. The authentication server 16 transmits the authentication data request information to the cloud service system 2 in response to the login request information. The cloud service system 2 forwards the authentication data request information to the browser application 124. The user 5 operates the browser application 124 to input a third authentication data in response to the authentication data request information. The browser application 124 accesses the characteristic data 1226 associated with the protected space 1224 from the protected space 1224 of the data storage unit 122, combines the third authentication data with the characteristic data 1226 associated with the protected space 1224 into a fourth authentication data, and transmits the fourth authentication data to the cloud service system 2. The cloud service system 2 forwards the fourth authentication data to the authentication server 16. The authentication server 16 judges if the fourth authentication data has the characteristic data 1226 associated with the protected space 1224, and if YES, the authentication server 16 judges if the third authentication data matches one of the plurality of first authentication data 1622, and if YES, the authentication server 16 transmits a login confirmation message to the cloud service system 2. The cloud service system 2 forwards the login confirmation message to the browser application 124.

In one embodiment, each first authentication data 1622 includes an account number, a password, a sample facial image, a sample biometric data or other kind of authentication data.

Figure 3:
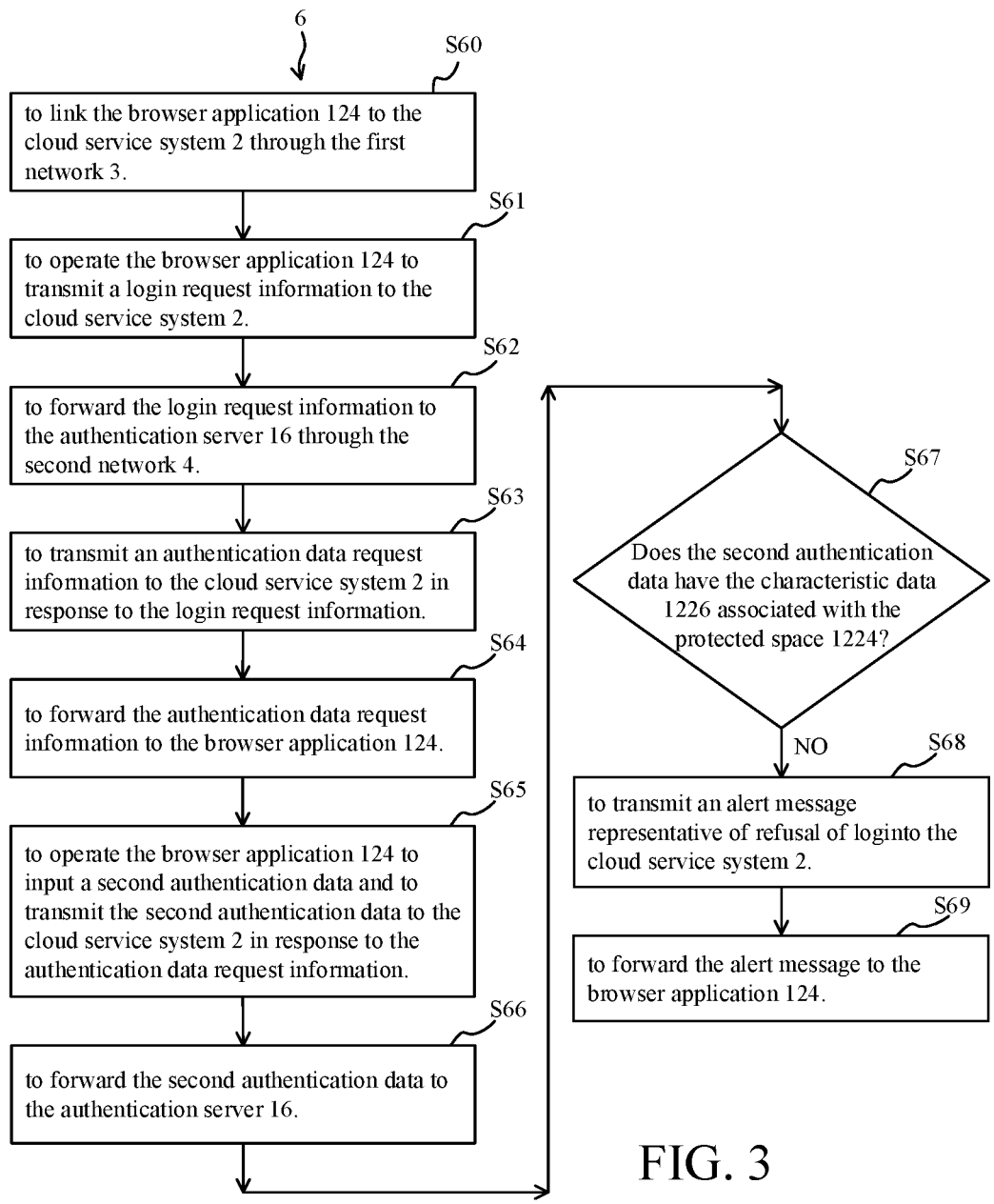
FIG. 3 is a flow diagram illustrating a managing method for managing authentication for a cloud service system in accordance with the second preferred embodiment of the invention.

Referring to FIG. 3, FIG. 3 is a flow diagram illustrating a managing method 6 for managing authentication for the cloud service system 2 in accordance with the second preferred embodiment of the invention. Regarding the implementation environment of the managing method 6 according to the invention, please refer to the implementation architecture diagram shown in FIG. 1, and refer to the functional block diagram, shown in FIG. 2, of the managing system 1 for managing authentication for the cloud service system 2.

The data processing apparatus 12 is capable of being linked to the cloud service system 2 through the first network 3 and includes the data storage unit 122 and the at least one processor 120. The data storage unit 122 is divided into the unprotected space 1222 and the protected space 1224. The browser application 124 is stored in the data storage unit 122, but does not need to be stored in the protected space 1224 of the data storage unit 122. The characteristic data 1226 associated with the protected space 1224 is stored in the protected space 1224 of the data storage unit 122. The authentication server 16 is capable of being linked to the cloud service system 2 through a second network 4, and therein stores a plurality of first authentication data 1622.

Firstly, as shown in FIG. 3, the managing method 6 according to the invention performs step S60 to link the browser application 124, by use of the at least one processor 120, to the cloud service system 2 through the first network 3 when a user 5 operates the at least one processor 120 to execute an unprotected start-up procedure to start up the browser application 124 to access from the unprotected space 1222 of the data storage unit 122 and further to link to the cloud service system 2.

Next, the managing method 6 according to the invention performs step S61 to operate the browser application 124, by the user 5, to transmit a login request information to the cloud service system 2.

Then, the managing method 6 according to the invention performs step S62 to forward the login request information, by the cloud service system 2, to the authentication server 16 through the second network 4.

Subsequently, the managing method 6 according to the invention performs step S63 to transmit an authentication data request information, by the authentication server 16, to the cloud service system 2 in response to the login request information.

Afterward, the managing method 6 according to the invention performs step S64 to forward the authentication data request information, by the cloud service system 2, to the browser application 124.

Next, the managing method 6 according to the invention performs step S65 to operate the browser application 124, by the user 5, to input a second authentication data and to transmit the second authentication data to the cloud service system 2 in response to the authentication data request information.

Then, the managing method 6 according to the invention performs step S66 to forward the second authentication data, by the cloud service system 2, to the authentication server 16.

Subsequently, the managing method 6 according to the invention performs step S67 to judge, by the authentication server 16, if the second authentication data has the characteristic data 1226 associated with the protected space 1224.

Then, if the judgment in step S67 is NO, the managing method 6 according to the invention performs step S68 to transmit an alert message representative of refusal of login, by the authentication server 16, to the cloud service system 2.

Finally, the managing method 6 according to the invention performs step S69 to forward the alert message, by the cloud service system 2, to the browser application 124.

In one embodiment, the alert message includes a request information of login through the protected space 1224.

In one embodiment, each first authentication data 1622 includes an account number, a password, a sample facial image, a sample biometric data or other kind of authentication data.

Figure 4:
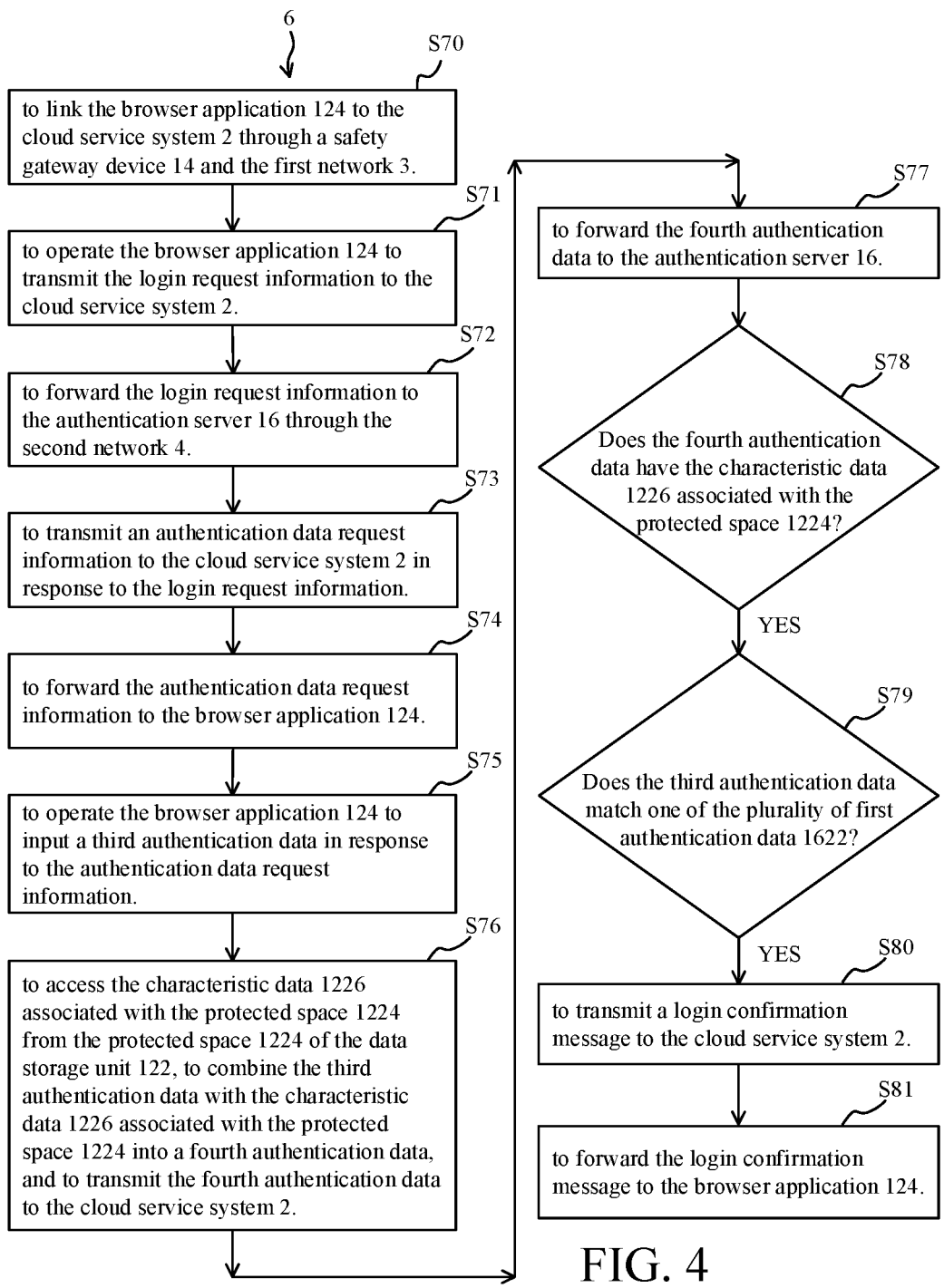
FIG. 4 is another flow diagram illustrating the managing method for managing authentication for the cloud service system in accordance with the second preferred embodiment of the invention.

Referring to FIG. 4, FIG. 4 is another flow diagram illustrating further steps of the managing method 6 for managing authentication for the cloud service system 2 in accordance with the second preferred embodiment of the invention.

Firstly, as shown in FIG. 4, the managing method 6 according to the invention performs step S70 also to link the browser application 124, by use of the at least one processor 120, to the cloud service system 2 through a safety gateway device 14 and the first network 3 when the user 5 operates the at least one processor 120 to execute a protected start-up procedure to start up the browser application 124 to access from the protected space 1224 of the data storage unit 122 and further to link to the cloud service system 2.

Next, the managing method 6 according to the invention performs step S71 to operate the browser application 124, by the user 5, to transmit the login request information to the cloud service system 2.

Then, the managing method 6 according to the invention performs step S72 to forward the login request information, by the cloud service system 2, to the authentication server 16 through the second network 4.

Subsequently, the managing method 6 according to the invention performs step S73 to transmit the authentication data request information, by the authentication server 16, to the cloud service system 2 in response to the login request information.

Afterward, the managing method 6 according to the invention performs step S74 to forward the authentication data request information, by the cloud service system 2, to the browser application 124.

Next, the managing method 6 according to the invention performs step S75 to operate the browser application 124, by the user 5, to input a third authentication data in response to the authentication data request information.

Then, the managing method 6 according to the invention performs step S76 to access, by the browser application 124, the characteristic data 1226 associated with the protected space 1224 from the protected space 1224 of the data storage unit 122, to combine the third authentication data with the characteristic data 1226 associated with the protected space 1224 into a fourth authentication data, and to transmit the fourth authentication data to the cloud service system 2.

Subsequently, the managing method 6 according to the invention performs step S77 to forward the fourth authentication data, by the cloud service system 2, to the authentication server 16.

Afterward, the managing method 6 according to the invention performs step S78 to judge, by the authentication server 16, if the fourth authentication data has the characteristic data 1226 associated with the protected space 1224.

Then, if the judgment in step S78 is YES, the managing method 6 according to the invention performs step S79 to judge, by the authentication server 16, if the third authentication data matches one of the plurality of first authentication data 1622.

Then, if the judgment in step S79 is YES, the managing method 6 according to the invention performs step S80 to transmit a login confirmation message, by the authentication server 16, to the cloud service system 2.

Finally, the managing method 6 according to the invention performs step S81 to forward the login confirmation message, by the cloud service system 2, to the browser application 124.

Compared to the prior art, the managing system and the managing method according to the invention can establish authentication with the cloud service system by confirming that a user operates in a safety protected space of a data processing apparatus.

With the detailed description of the above preferred embodiments of the invention, it is clear to understand that a managing system and a managing method for managing authentication for a cloud service system in accordance with the invention can establish authentication with the cloud service system by confirming that a user operates in a safety protected space of a data processing apparatus, and can achieve the purpose of securely being certified with the cloud service system.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A managing system for managing authentication for a cloud service system, comprising:
   a data processing apparatus, coupled to the cloud service system through a first network, the data processing apparatus comprising:
   a hardware data storage, being divided into an unprotected space and a protected space, wherein a browser application is stored in the hardware data storage, a characteristic data associated with the protected space is stored in the protected space; and
   at least one hardware processor, coupled to the hardware data storage;
   a safety gateway, coupled to the data processing apparatus; and
   an authentication server, coupled to the cloud service system through a second network and therein storing a plurality of first authentication data;
   wherein when a user operates the at least one hardware processor to execute an unprotected start-up procedure to start up the browser application to access from the unprotected space and further to link to the cloud service system, the at least one hardware processor makes the browser application to link to the cloud service system through the first network, the user operates the browser application to transmit a login request information to the cloud service system, the cloud service system forwards the login request information to the authentication server through the second network, the authentication server transmits an authentication data request information to the cloud service system in response to the login request information, the cloud service system forwards the authentication data request information to the browser application, the user operates the browser application to input a second authentication data in response to the authentication data request information and transmits the second authentication data to the cloud service system, the cloud service system forwards the second authentication data to the authentication server, the authentication server judges if the second authentication data has the characteristic data associated with the protected space, and if NO, the authentication server transmits an alert message representative of refusal of login to the cloud service system, the cloud service system forwards the alert message to the browser application; and
   wherein when the user operates the at least one hardware processor to execute a protected start-up procedure to start up the browser application to access from the protected space and further to link to the cloud service system, the at least one hardware processor makes the browser application to link to the cloud service system through the safety gateway and the first network, the user operates the browser application to transmit the login request information to the cloud service system, the cloud service system forwards the login request information to the authentication server through the second network, the authentication server transmits the authentication data request information to the cloud service system in response to the login request information, the cloud service system forwards the authentication data request information to the browser application, the user operates the browser application to input a third authentication data in response to the authentication data request information, the browser application accesses the characteristic data associated with the protected space from the protected space, combines the third authentication data with the characteristic data associated with the protected space into a fourth authentication data, and transmits the fourth authentication data to the cloud service system, the cloud service system forwards the fourth authentication data to the authentication server, the authentication server judges if the fourth authentication data has the characteristic data associated with the protected space, and if YES, the authentication server judges if the third authentication data matches one of the plurality of first authentication data, and if YES, the authentication server transmits a login confirmation message to the cloud service system, and the cloud service system forwards the login confirmation message to the browser application.

2. The managing system of claim 1, wherein the alert message comprises a request information of login through the protected space.

3. The managing system of claim 2, wherein each first authentication data comprises one selected from the group consisting of an account number, a password, a sample facial image, and a sample biometric data.

4. A managing method for managing authentication for a cloud service system, wherein a data processing apparatus is coupled to the cloud service system through a first network and comprises a data storage and at least one processor, the data storage is divided into an unprotected space and a protected space, a browser application is stored in the data storage, a characteristic data associated with the protected space is stored in the protected space, an authentication server is coupled to the cloud service system through a second network and therein stores a plurality of first authentication data, said managing method comprising the steps of:
   (a) when a user operates the at least one processor to execute an unprotected start-up procedure to start up the browser application to access from the unprotected space and further to link to the cloud service system, linking the browser application, by use of the at least one processor, to the cloud service system through the first network;

(b) operating the browser application, by the user, to transmit a login request information to the cloud service system;

(c) forwarding the login request information, by the cloud service system, to the authentication server through the second network;

(d) in response to the login request information, transmitting an authentication data request information, by the authentication server, to the cloud service system;

(e) forwarding the authentication data request information, by the cloud service system, to the browser application;

(f) in response to the authentication data request information, operating the browser application, by the user, to input a second authentication data and transmitting the second authentication data to the cloud service system;

(g) forwarding the second authentication data, by the cloud service system, to the authentication server;

(h) judging, by the authentication server, if the second authentication data has the characteristic data associated with the protected space;

(i) if the judged result in step (h) is NO, transmitting an alert message representative of refusal of login, by the authentication server, to the cloud service system;

(j) forwarding the alert message, by the cloud service system, to the browser application;

(k) when the user operates the at least one processor to execute a protected start-up procedure to start up the browser application to access from the protected space and further to link to the cloud service system, linking the browser application, by use of the at least one processor, to the cloud service system through a safety gateway and the first network;

(l) operating the browser application, by the user, to transmit the login request information to the cloud service system;

(m) forwarding the login request information, by the cloud service system, to the authentication server through the second network;

(n) in response to the login request information, transmitting the authentication data request information, by the authentication server, to the cloud service system;

(o) forwarding the authentication data request information, by the cloud service system, to the browser application;

(p) in response to the authentication data request information, operating the browser application, by the user, to input a third authentication data;

(q) by the browser application, accessing the characteristic data associated with the protected space from the protected space, combining the third authentication data with the characteristic data associated with the protected space into a fourth authentication data, and transmitting the fourth authentication data to the cloud service system;

(r) forwarding the fourth authentication data, by the cloud service system, to the authentication server;

(s) judging, by the authentication server, if the fourth authentication data has the characteristic data associated with the protected space;

(t) if the judged result in step (s) is YES, judging, by the authentication server, if the third authentication data matches one of the plurality of first authentication data;

(u) if the judged result in step (t) is YES, transmitting a login confirmation message, by the authentication server, to the cloud service system; and (v) forwarding the login confirmation message, by the cloud service system, to the browser application.

5. The managing method of claim 4, wherein the alert message comprises a request information of login through the protected space.

6. The managing method of claim 5, wherein each first authentication data comprises one selected from the group consisting of an account number, a password, a sample facial image, and a sample biometric data.

* * * * *